Jan. 24, 1961 J. MARTIN 2,969,212
APPARATUS FOR EJECTING BODIES FROM A PARENT AERODYNE
Filed April 12, 1957 4 Sheets-Sheet 1
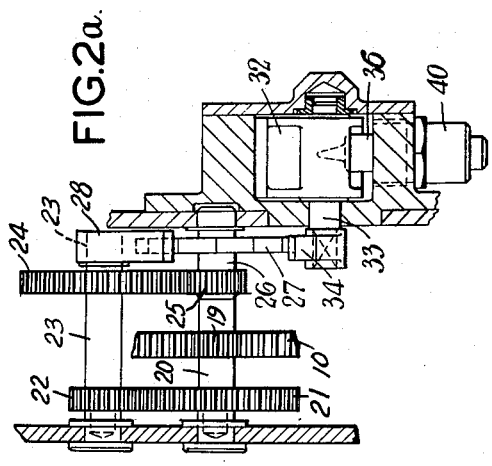
FIG.2a.
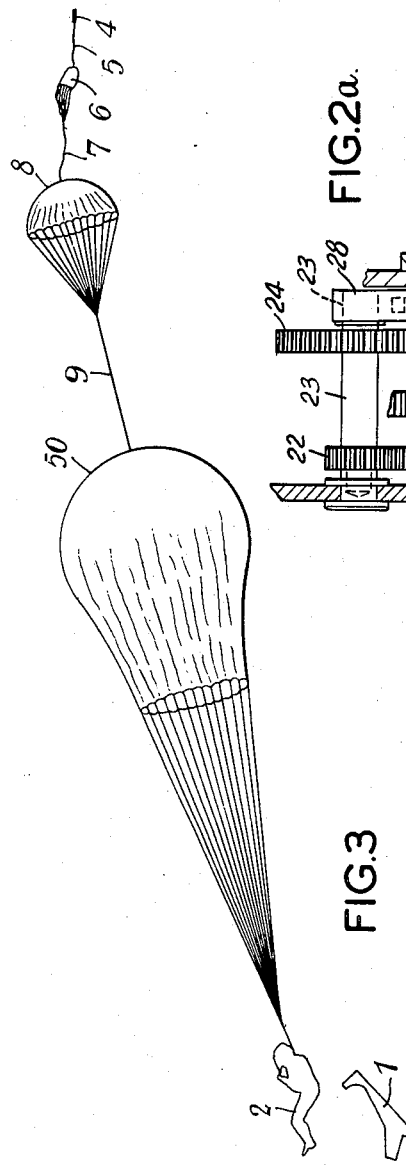
FIG.3
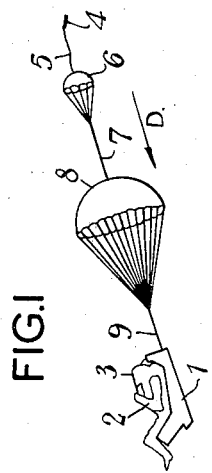
FIG.I ically 2,969,212
Patented Jan. 24, 1961

2,969,212

APPARATUS FOR EJECTING BODIES FROM A PARENT AERODYNE

James Martin, Southlands Manor, Southlands Road, Denham, near Uxbridge, Middlesex, England Filed Apr. 12, 1957, Ser. No. 652,392

Claims priority, application Great Britain Aug. 31, 1956

9 Claims. (Cl. 244—147)

This invention relates to ejection seats for aircraft of the type adapted to be launched from an aircraft with a person seated therein but is applicable for ejecting any body from a parent aerodyne. Mechanism may be provided to launch the seat from the aircraft by means of an ejection unit actuated by gas pressure generated by the firing of one or more explosive cartridges. In such ejection seats, means may be provided by which the occupant of the seat is relieved of all but the initial act of bringing the ejection apparatus into operation. The various subsequent steps in the functioning of the apparatus are then carried out automatically in the correct sequence and with the correct timing. These steps may, for example, include the firing of a piston from an ejector gun in order to draw out a pilot drogue parachute, the drawing out of a main drogue parachute by the pilot drogue and, finally, the drawing out of the main parachute by the main drogue.

It has been found desirable to enable the seat and occupant to be ejected from an aircraft flying at very low level or taxi-ing on the runway prior to take-off. Under such conditions, it is essential to ensure the early opening of the main parachute canopy so that the person's rate of descent is sufficiently slowed down before he strikes the ground. However, the same short delay, if operative when the seat is ejected at high speed, will inevitably result in the bursting of the main parachute canopy. This is because the seat would not have had sufficient time to slow down, even with the assistance of one or more drogue parachutes, to a speed at which it would be safe to deploy the main parachute canopy.

From the foregoing explanation, it will be evident that different time delays are required when the body or seat is ejected at low speed and at high speed. The object of the present invention is to provide a time delay mechanism controlling the release of the main parachute, so that the delay is short when the body or seat is ejected at low speed and longer when it is ejected at high speed.

According to the present invention a body such as an ejection seat for aircraft, of the type adapted to be launched from an aircraft with a person seated therein, having a drogue parachute for drawing out the main parachute, has a delay mechanism for delaying the drawing out of the main parachute after the drawing out of the drogue parachute and inertia operated means for preventing the drawing out of the main parachute so long as the body or seat is subject to a retardation in excess of a critical value, that is, to lock such mechanism when it is subjected to a change in velocity in excess of a predetermined value but to release it when the body is subjected to a velocity less than such predetermined value.

In a preferred embodiment of the invention, the delay mechanism comprises an escapement mechanism which controls the withdrawal of a biased operating member such as a spring-loaded rack from its housing, the rack being withdrawn from its housing prior to the drawing out of the main parachute and the escapement mechanism is lockable by an inertia lock which comprises a lever carrying a mass and operating a pawl, the mass being moved against spring restraint by retardation of the seat, causing the pawl to lock an escapement wheel.

The device includes a primary releasable means (see elements 16, 17 and 18 of Fig. 2b) for holding the operating means in its initial locked position.

In order that the invention may be readily carried into effect, an embodiment will now be particularly described, by way of example, with reference to the accompanying drawings, of which:

Figure 1 is a diagrammatic view showing an ejection seat after it has been ejected from an aircraft with its occupant and after a pilot drogue and main drogue parachute have been drawn out;

Figure 2a is a part vertical sectional elevation and part front view of a part of the time delay mechanism and the inertia lock of Figure 2;

Figure 3 is a diagrammatic view showing the seat portion falling away at the time the main parachute canopy is being developed.

Figure 2:
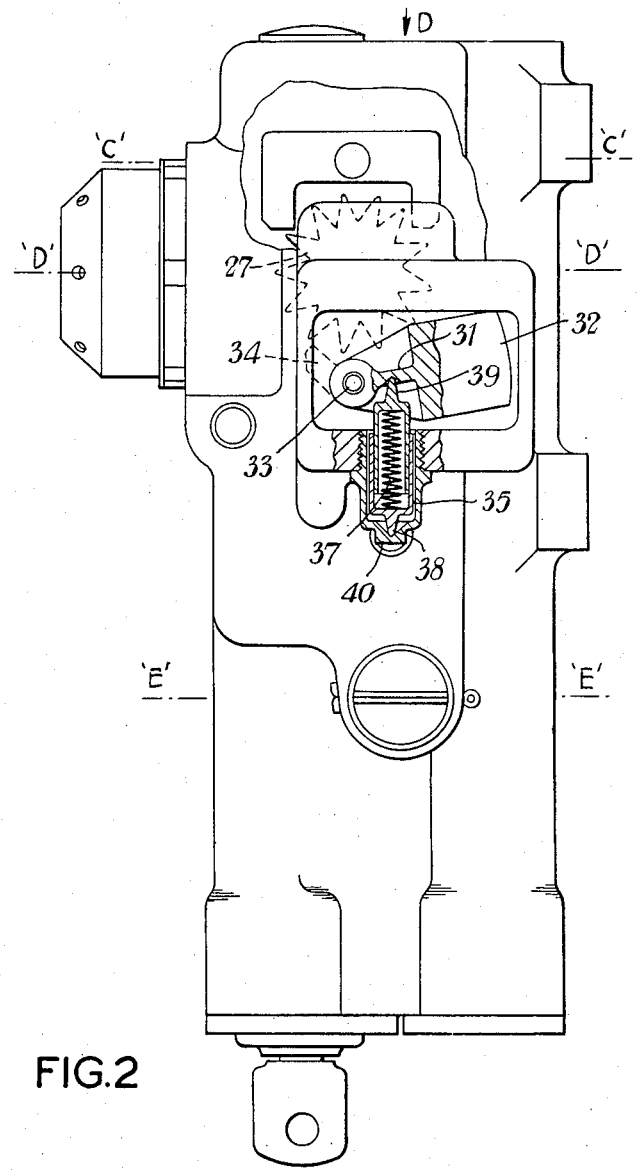
Figure 2 is a side view of a housing attached to the ejection seat, part of the housing being broken way to show the construction of a time delay mechanism and inertia lock.

Shown in Figure 1 of the drawings is an ejection seat 1 with its occupant 2 still seated therein. The sequence of operation commencing with ejection of the seat from an aircraft has already been initiated, in this case by the occupant drawing a screen 3 over his face. Following ejection of the seat 1, a piston 4 has been fired from an ejector gun, not shown, and has drawn out a pilot drogue parachute 6 by tension on the connecting line 5. The pilot drogue is attached by a line 7 to a main drogue parachute which is drawn out after the pilot drogue. At this stage of operation, the main drogue 8 it attached to the top of the seat 1 by a line 9.

Means by which the above sequence of operations can be effected are already known from, for example U.S. Patents Nos. 2,502,470; 2,527,020; 2,762,588 and 2,708,083 and do not form a part of the present invention.

It is to be noted from Figure 1 that the development of the pilot drogue 6 and subsequently the main drogue 8 has tilted the seat 1 backwards from the substantially vertical position which such a seat occupies while in an aircraft. The direction of travel of the seat and occupant at this time is shown by the arrow D.

Figure 2B:
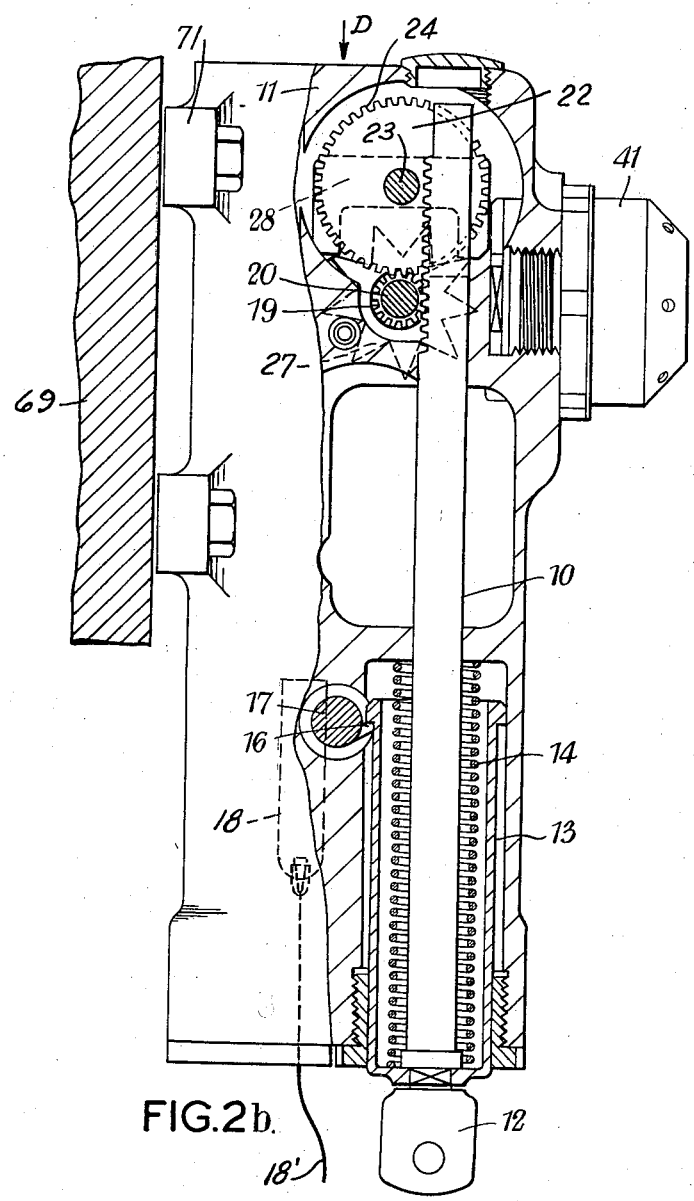
Figure 2b is a longitudinal sectional view of the housing of Figure 2 and the mechanism arranged therein.
Figure 2C:
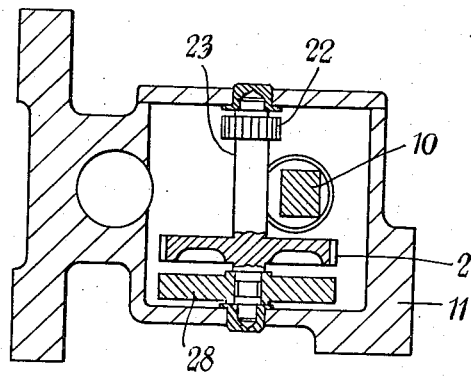
Figure 2c is a transverse sectional view in the plane C—C of Figure 2.
Figure 2D:
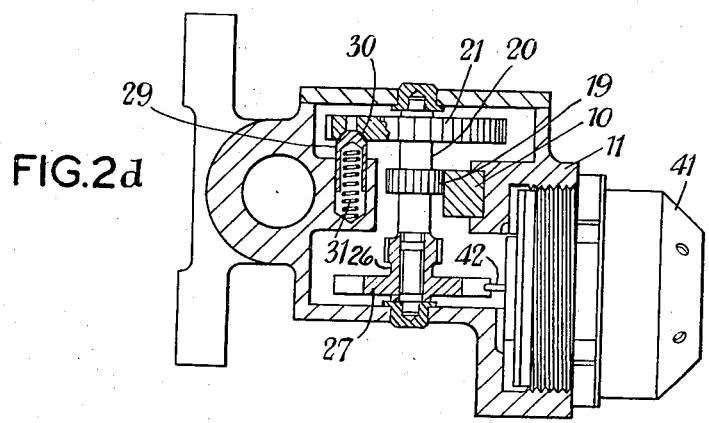
Figure 2d is a transverse sectional view in the plane D—D of Figure 2.
Figure 2E:
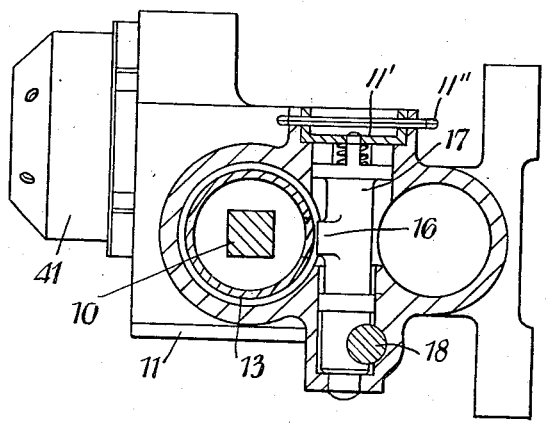
Figure 2e is a transverse sectional view in the plane E—E of Figure 2.

The housing 11 of the time release shown in Figures 2 to 2e is mounted on the seat 1 in a position such that the arrow D of Figure 2 substantially coincides with the direction of descent as shown by the arrow D of Figure 1. For example, the housing 11 can be mounted on the side 69 of the seat 1 by conventional means such as bolts 70 passing through the lugs 71 as shown in Fig. 2b.

The mechanism of the time release comprises a biased operating member such as a rack 10 initially retained in the housing 11. The rack 10 terminates at its lower end in a head 12 which retains a plunger 13 (Figs. 2b and 2e) housing a spring 14, which is under compression as viewed in Figure 2b. The plunger 13 has a flange 15 at its upper end which is engaged by the latch 16 of a sear 17 retained in position in the housing 11 by a cover 11' and cotter pin 11'' (see Fig. 2c). As shown in Figure 2e, the sear 17 is locked by a locking pin 18 so that the rack plunger 13 and rack 10 are retained as shown in Figure 2b against the action of the spring 14. Withdrawal of the pin 18 frees the rack 10 and permits it to commence to descend.

The toothed part of the rack 10 meshes with a pinion 19 fixed on a primary shaft 20 which also has fixed thereon a gear wheel 21 of larger diameter, as shown in Figure 2d. The gear wheel 21 meshes with a pinion 22 of smaller diameter fixed on a secondary shaft 23. The secondary shaft 23 also has fixed thereon a gear wheel 24, as shown in Figure 2b and 2c, which meshes with a small diameter pinion 25. As shown in Figure 2a and 2d, the pinion 25 is fixed on a short shaft 26 with an escapement wheel 27 which co-operates with an U-shaped escapement rocker 28, the shaft 26 being tubular and coaxially mounted on the shaft 20 so as to be freely rotatable thereon. The escapement rocker 28 is centrally freely pivoted on the shaft 23.

During the act of cocking the mechanism, it is important that the primary pinion 19 is in such a position that the teeth on the rack 10 are able to engage the pinion teeth without jamming. To this end a hollow ball-end plunger 29 is provided, as shown in Fig. 2d. Urged outwards, as shown in the figure, by a compression spring 31', the plunger 29 engages a detent 30 in the side of the gear wheel 21.

When the rack 10 is disengaged from the pinion 19, after the operation described hereinafter, the plunger 29 engages the detent 30 thereby preventing over-running of the mechanism due to inertia. This action retains the primary pinion 19 in the proper position to permit subsequent reengagement of the rack 10 therewith.

An inertia lock for the escapement wheel 27 comprises a lever 31 (Figures 2 and 2a) carrying a mass 32 at one extremity and fixed on a shaft 33 rotatable about its axis in the housing 11. The shaft 33 also has fixed thereon a pawl 34 which, when the lever 31 pivots, is moved by the shaft 33 to intercept the teeth of the escapement wheel 27.

The lever 31 is held in the position shown in Figures 2 and 2a by a compression spring device comprising an outer shell 35 and an inner shell 36 which telescope one within the other and which together house a compression spring 37. The shells 35, 36 are provided with pointed noses 38, 39 which engage detents in a retaining chamber 40 and the lever 31 respectively.

As best shown in Figure 2d, a barostat 41 is also provided housing an aneroid capsule fixed in relation to the housing 11 at one end and carrying a pin 42 at its free end. The aneroid capsule is adjusted so that in a rarefied atmosphere, corresponding to an altitude higher than, say, 10,000 feet, the pin 42 intercepts the teeth of the escapement wheel 27 to prevent its rotation.

The present invention is not concerned with this feature of the mechanism and it is sufficient to state that if the seat is ejected from an aircraft at an altitude greater than 10,000 feet, in the example given, the escapement wheel is independently locked by the pin 42, regardless of the position of the pawl 34 but is released after the seat falls below 10,000 feet.

For this reason, the description of the operation of the invention which follows assumes the ejection of the seat at an altitude low enough for the barostat lock to be inoperative.

The operation will first be explained for ejection when the aircraft is travelling at low speed and it is required quickly to develop the main parachute canopy.

On ejection of the seat 1 from the aircraft, the locking pin 18 is withdrawn, for example by being attached by a line 18' (Fig. 2b) to the aircraft. The sear 17 is freed so that the latch 16 is freely rotatable by the flange 14 of the rack plunger 13. The rack 10 is urged downwardly, in the view of Figure 2b, by the action of compression spring 14. However, the rack 10 does not have a free run as the toothed part is meshed with the gear train 19, 21, 22, 24, 25 driving the escapement wheel 27. The escapement wheel 27 is permitted intermittent rotation tooth by tooth by oscillation of the rocker 28 so that the rack 10 is released with a controlled movement which gives a short predetermined time delay.

The final release of the rack 10 releases shackles, of the type shown in Figs. 5 and 19 of United States Patent No. 2,708,083, by which the main drogue line 9 is initially attached to the top of the seat 1. The main drogue line 9, thus freed, then draws out the main parachute 50 (Figure 3) to which it is attached. Simultaneously, the harness (for example, that shown in U.S. Patents Nos. 2,655,324 and 2,708,083, by which the occupant 2 is held in the seat 1 is released so that the seat falls away.

Figure 3 shows this stage of operation when the seat 1 is falling away and the main parachute canopy 50, which is connected to the parachute harness of the airman 2, is in process of being developed.

In the case when the seat 1 is ejected from an aircraft travelling at high speed, the firing pin 18 is withdrawn and the sear released as previously described to free the rack 10 subject to the release by the escapement 27, 28.

The piston 4 is fired from the drogue gun so drawing out the pilot drogue and then the main drogue 6 parachute 8 as shown in Figure 1. In this position the seat 1 and drogues 8, 6 experience very considerable air resistance which has a braking action on the seat 1 and occupant 2. The resultant deceleration of the seat in the direction of the arrow D of Figure 1 causes the mass 32 of the lever 31 to be forced downwardly by its own inertia, that is in the direction of the arrow D of Figure 2, compressing the spring 37 and rotating the shaft 33. This action moves the pawl 34 to intercept the next tooth of the escapement wheel 27. The escapement mechanism is locked thereby so long as the seat 1 is subject to retardation in excess of a critical value.

The critical value is that at which the compression spring acts to restore the lever 31 to the position in which it is shown in Figure 2. This action retracts the pawl 34 and frees the escapement mechanism.

After the seat has been slowed down to such a speed that it is safe to draw out the main parachute canopy 50 without risk of its bursting, the escapment mechanism is released in this way and the release of the rack 10 proceeds as previously described. Thus, it is seen that the main parachute is not released until three distinct but functionally cooperative devices have operated in a definite sequence: the first device being the releasable lock comprising the pin 18, sear 17 and pawl 16 (see Fig. 2b), the second device comprising the inertia operated means comprising the elements 31, 32, 33, 34 (see Fig. 2) and the third being the time delay mechanism comprising the rack 10 and the gear train controlled by the escapement mechanism.

I claim:

1. In combination, a body arranged to be ejected from a parent aerodyne, a biased operating member mounted on said body for movement relative to said body from a locked position to a released position, releasable means for holding said operating means in said locked position, said holding means being mounted on said body and attached to said aerodyne so that said holding means is released upon ejection of said body, an escapment mechanism mounted on said body and arranged to retard the movement of said operating means when it is released by said holding means and inertia operated means mounted on said body and arranged to lock said escapement mechanism when said body is subjected to a change in velocity in excess of a predetermined value and to release said mechanism when said body is subjected to a change in velocity less than such predetermined value.

2. In combination, a body arranged to be ejected from a parent aerodyne, a main parachute attached to said body, a drogue parachute attached to said main parachute and adapted to draw out said main parachute, a time delay mechanism mounted on said body and releasably connected between said drogue parachute and said main parachute to delay the drawing out of the main parachute by said drogue, said time delay mechanism comprising a biased operating member mounted on said body for movement relative to said body from a locked position to a position which will release said main parachute, releasable means for holding said operating means in said locked position, said holding means being mounted on said body and attached to said aerodyne so that said holding means is released upon ejection of said body, an escapement mechanism mounted on said body and arranged to retard the movement of said operating means when it is released by said holding means and inertia operated means mounted on said body and arranged to lock said escapement mechanism when said body is subjected to a change in velocity in excess of a predetermined value and to release said mechanism when said body is subjected to a change in velocity less than such predetermined value.

3. The combination as recited in claim 2 in which the releasable means for holding said operating means comprises a rotatable member carrying means to lock said operating member against movement, removable means positioned normally to prevent rotation of said rotatable member and a line having one end attached to said removable means and the other end attached to said aerodyne so that said removable means is removed from its locking position upon ejection of said body.

4. The combination as recited in claim 2 in which said operating member comprises a spring-loaded rack, a rotatable pinion positioned to mesh with said rack, said escapement mechanism being arranged and positioned to retard the rotation of said pinion.

5. The combination as recited in claim 2 in which said inertia operated means comprises a lever having a mass on one end and a pawl on the other end, said lever being so positioned with respect to said escapement mechanism that said pawl will lock said escapement mechanism only when said mass is subjected to a change in velocity of said body in excess of said predetermined value, and a spring-loaded member positioned to urge said pawl out of locking engagement with said escapement mechanism.

6. In combination, a seat arranged to be ejected from an aircraft, a main parachute attached to said seat, a drogue parachute attached to said main parachute and adapted to draw out said main parachute, a time delay mechanism mounted on said seat and releasably connected between said drogue parachute and said main parachute to delay the drawing out of the main parachute by said drogue, said time delay mechanism comprising a biased operating member mounted on said seat for movement relative to said seat from a locked position to a position which will release said main parachute, releasable means for holding said operating means in said locked position, said holding means being mounted on said seat and attached to said aircraft so that said holding means is released upon ejection of said seat, an escapement mechanism mounted on said seat and arranged to retard the movement of said operating means when it is released by said holding means and inertia operated means mounted on said seat and arranged to lock said escapement mechanism when said body is subjected to a change in velocity in excess of a predetermined value and to release said mechanism when said body is subjected to a change in velocity less than such predetermined value.

7. The combination as recited in claim 6 in which said releasable means for holding said operating member in locked position comprises a rotatable member carrying a pawl normally positioned to lock said operating member, a removable pin positioned to normally prevent rotation of said rotatable member, a line having one end attached to said pin and the other end attached to said aircraft so that said pin is removed upon ejection of said seat.

8. The combination as recited in claim 6 in which said inertia operated means comprises a lever having a mass on one end and a pawl on the other end, said lever being so positioned with respect to said escapement mechanism that said pawl will lock said escapement mechanism only when said mass is subjected to a change in velocity of said body in excess of said predetermined value, and a spring-loaded member positioned to urge said pawl out of locking engagement with said escapement mechanism.

9. In combination, a seat arranged to be ejected from an aircraft, a main parachute attached to said seat, a drogue parachute attached to said main parachute and adapted to draw out said main parachute, a housing mounted on said seat and enclosing a time delay mechanism which is connected between said drogue parachute and said main parachute to delay the drawing out of the main parachute after the drawing out of the drogue parachute, said time delay mechanism comprising a spring-loaded rack, a rotatable member normally positioned to lock said rack against the tension of its spring, a removable member positioned to prevent rotation of said rotatable member, a line having one end attached to said removable member and the other end attached to said aircraft so that said removable member is removed upon ejection of said seat, a rotatable pinion positioned to mesh with said rack, an escapement mechanism to retard rotation of said pinion and inertia operated means comprising a lever having a mass on one end and a pawl on the other end, said lever being so positioned that said pawl will engage and lock said escapement mechanism only when said seat is subjected to a change in velocity in excess of a predetermined value, and a spring-loaded member positioned in said housing to urge said pawl out of locking engagement with said escapement mechanism.

References Cited in the file of this patent

UNITED STATES PATENTS

| | | |
|---|---|---|
| 2,675,198 | Reihman | Apr. 13, 1954 |
| 2,708,083 | Martin | May 10, 1955 |
| 2,762,588 | Martin | Sept. 11, 1956 |
| 2,798,683 | Swenson | July 9, 1957 |